United States Patent Office 3,022,342
Patented Feb. 20, 1962

3,022,342
PROCESS FOR THE MANUFACTURE OF SORBIC ACID
Hans Fernholz, Bad Soden (Taunus), and Kurt Ruths and Klaus Heimann-Trosien, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 29, 1958, Ser. No. 783,198
Claims priority, application Germany January 4, 1958
6 Claims. (Cl. 260—526)

The present invention relates to a process for the manufacture of sorbic acid.

It is known to prepare sorbic acid by adding ketene to crotonaldehyde in the presence of an insert solvent and an acid catalyst, preferably a borotrifluoride catalyst, to obtain a lactone which can be converted to sorbic acid by treating said lactone with a strong acid or with alkalies, the latter treatment giving considerably poorer yields.

Now we have found that the reaction of ketene with crotonaldehyde in the presence of a catalytic amount of a fatty acid salt of a bivalent transition metal surprisingly leads to a product which cannot or can only partially be converted to sorbic acid by treating said product with a strong acid as above described, but from which product, however, without previous separation of the catalyst used, sorbic acid can be obtained in a better yield as compared with the known process by thermally decomposing said product in one operation, if desired in the presence of a small amount of an alkali metal, with the exclusion of oxygen, for example in the form of air, and in the presence of inert gases such as nitrogen or carbon dioxide, and simultaneously distilling off the sorbic acid formed in said reaction. This result is absolutely surprising since, according to the present literature, sorbic acid cannot be distilled without decomposition. The first stage of the present process leads to a new product which obviously differs from the lactone obtained in the known process and whose properties indicate an ester with a molecular weight of between about about 1000 and 3000. Said product is probably a polyester which is obtained in a practically quantitative yield during the reaction of ketene with crotonaldehyde from the beta-lactone intermediarily formed.

In the process of the present invention for the manufacture of sorbic acid ketene and crotonaldehyde are contacted at a temperature in the range from 20° C. to suitably not more than 50° C. in the presence of at least one fatty acid salt of at least one bivalent transition metal and at least one solvent which is inert towards the reaction, the solvent and a possible excess of aldehyde are distilled off and the polymeric product obtained (polyester) which still contains the catalyst is distilled with the exclusion of oxygen and in the presence of at least one inert gas such as nitrogen or carbon dioxide, directly at a temperature in the range from 125° C. to 270° C., preferably from 140° C. to 250° C., and advantageously under reduced pressure. It is likewise possible to carry out the distillation at atmospheric pressure or under superatmospheric pressure, for example of up to about 100 mm. of mercury. In the distillation of the polyester the presence of a small amount, in general 0.1 to 10%, preferably 0.4 to 5% of an alkali metal hydroxide and/or an alkali metal salt having a basic reaction calculated as alkali metal hydroxide and related to the amount of polyester, is particularly suitable. Salts of this kind are, for example, sodium and potassium carbonate, sodium bicarbonate, sodium isobutyrate, sodium caproate, sodium caprylate, sodium palmitate, sodium stearate, sodium terephthalate or sodium sorbate.

As catalysts suitable for use in this invention there may be used, as already mentioned, fatty acid salts of bivalent transition metals, preferably of subgroups II to VIII of the periodic table, such as cadmium, iron, nickel, mercury, cobalt or zinc or mixtures of these salts provided that the fatty acid radical contains 4 to 18 carbon atoms. In view of the fact that sorbic acid is often used for the preservation of food, it is advisable to use compounds of transition metals which are non-toxic for human beings so as to exclude any risk in case the final product obtained should still contain traces of said metals. It is especially advantageous to use zinc salts of fatty acids, particularly zinc isobutyrate or zinc isovaleriate. There may also be used salts of butyric acid, valeric acid, alpha-methylbutyric acid, diethylacetic acid, caproic acid, caprylic acid, capric acid, lauric acid, 2-ethyl caproic acid, stearic acid, palmitic acid, oleic acid and other fatty acids containing 4 to 18 carbon atoms. The catalysts are generally used in a proportion of between 0.1 and 5%, preferably between 0.5 and 2%, calculated on the quantity of crotonaldehyde employed but sometimes they may also be used in a quantity outside the ranges indicated above.

As suitable solvents for the reaction of ketene with crotonaldehyde there may be used aromatic, aliphatic and alicyclic hydrocarbons or the derivatives thereof, and an excess of crotonaldehyde itself. There may be mentioned more especially hexane, heptane, octane, benzene, toluene, xylene, cyclohexane, methylene chloride, chloroform, carbon tetrachloride, chlorobenzene, nitrobenzene etc. It is often preferred to use equivalent amounts of ketene and crotonaldehyde in which the catalyst is dissolved. In this case the reaction is not entirely complete because a small proportion of the crotonaldehyde acts as a solvent and does not react. It is also preferred to carry out the reaction at a temperature between 25 and 35° C.; it is, however, also possible, if desired, to operate at a higher temperature although such operation generally leads to less good results. If the first stage of the reaction is carried out at a temperature lower than about 20° C. the reaction proceeds slowly and incompletely.

In general the sorbic acid is thermally decomposed and distilled in the absence of solvents. Sometimes, however it may be of advantage to add at the beginning or in the course of the distillation small amounts, for example 2 to 15%, of a solvent having a higher boiling point than sorbic acid in order to avoid towards the end of the reaction a solidification of the residue which has not distilled. It is likewise possible to add the above-mentioned alkali metals in the form of suspensions or solutions as concentrated as possible in a solvent which is inert towards the reaction. These likewise small amounts of solvent are then obtained either at the beginning of the distillation in the first runnings or, when they are less volatile than sorbic acid, they serve to liquefy the residue. The fact that in the thermal decomposition of the polymeric product no solvent or only small amounts of solvent are used represents a considerable advantages from an economical point of view. Thus considerable amounts of energy may be economized. In the process of the present invention about 85% of analytically pure sorbic acid suitable for preservation are obtained on an average. Consequently the yields are considerably higher than the yields obtained in known processes. The process of the invention is furthermore suitable, due to its simplicity, to produce sorbic acid on an industrial scale in a continuous operation.

The following examples serve to illustrate the invention but they are not intended to limit it thereto.

*Example 1*

420 grams of ketene are introduced at a temperature in the range from 25 to 35° C. into a mixture of 800 grams of crotonaldehyde, 1200 cc. of toluene and 8 grams of zinc isovaleriate, which mixture is mechanically stirred or removed in another suitable manner. The excess of crotonaldehyde (100 grams) and the toluene are distilled off under reduced pressure. 1150 to 1250 grams of polyester are obtained as residue in the form of a highly viscous, brown liquid which still contains some toluene.

200 grams of the catalyst-containing polyester are admixed with 1 gram of pulverized sodium hydroxide, heated to 160–170° C. in a distilling flask provided with a column heated to about 130° C., while nitrogen or carbon dioxide is introduced, and distilled under a reduced pressure of 8 to 10 mm. of mercury. The sorbic acid which distills over at a temperature in the range from 130 to 140° C. has a melting point of 134° C. The yield amounts to 173 grams corresponding to 86.5%. When 0.4 gram of sodium hydroxide are added instead of 1 gram the yield amounts to 168 grams corresponding to 84%.

*Example 2*

420 grams of ketene are introduced at a temperature of 30 to 35° C. into a mechanically stirred mixture of 800 grams of crotonaldehyde, 1200 cc. of toluene and 10 grams of cobalt stearate. The excess of crotonaldehyde and toluene is distilled off whereby a polymeric product (polyester) remains.

400 grams of the polyester obtained are admixed with 2 grams of commercial soft soap (potash soap) and distilled, while carbon dioxide is introduced, at 180 to 190° C. under a pressure of 12 to 15 mm. of mercury. At 135 to 145° C. 352 grams of sorbic acid distil over corresponding to 88%.

In further tests carried out with the addition of 1 gram of potassium carbonate, 1.5 grams of sodium sorbate, 2 grams of sodium caproate or 2 grams of commercial curd soap (soda soap) under otherwise identical conditions, the yields of sorbic acid vary between 83 and 89% whereas the yield is smaller by about 15% without addition and by about 10% with the addition of 3 grams of calcium hydroxide.

We claim:

1. In a process for the manufacture of sorbic acid which comprises contacting ketene with crotonaldehyde at a temperature between about 20° C. to about 50° C. in the presence of a fatty acid salt of a bivalent metal selected from the group consisting of cadmium, iron, nickel, mercury, cobalt, and zinc, said fatty acid having 4 to 18 carbon atoms, and in the presence of an inert solvent, the improvement of distilling off vaporizable compounds from the reaction mixture, whereby a polyester residue is produced, and then distilling said polyester, containing said fatty acid salt, at a temperature between about 125° C. and about 270° C. with exclusion of oxygen and in the presence of an inert gas, whereby said polyester is decomposed to form sorbic acid.

2. A process as in claim 1, wherein said polyester is distilled at a temperature between about 140° C. and about 250° C.

3. A process as in claim 1 wherein said polyester is distilled in the presence of a small amount of an alkaline substance selected from the group consisting essentially of alkali metal hydroxides and basic alkali metal salts.

4. A process as in claim 3 wherein said alkaline substance is present in an amount of 0.1 to 10 percent, based on the polyester.

5. In a process for the manufacture of sorbic acid which comprises contacting ketene with crotonaldehyde at a temperature between about 20° C. to about 50° C. in the presence of a fatty acid salt of a bivalent metal selected from the group consisting of cadmium, iron, nickel, mercury, cobalt, and zinc, said fatty acid having 4 to 18 carbon atoms, and in the presence of an inert solvent, the improvement of distilling off vaporizable compounds from the reaction mixture, whereby a polyester residue is produced, and then distilling said polyester, containing said fatty acid salt, at a temperature between about 125° C. and 270° C., at sub-atmospheric pressure, with exclusion of oxygen and in the presence of an inert gas, and in the presence of from 0.1 to 10 percent, based on the amount of polyester, of an alkaline substance selected from the group consisting essentially of alkali metal hydroxides and basic alkali metal salts, whereby said polyester is decomposed to form sorbic acid.

6. A process as in claim 5 wherein said polyester is distilled in the presence of a small amount of an inert solvent for sorbic acid, said solvent having a boiling point higher than that of sorbic acid.

References Cited in the file of this patent

UNITED STATES PATENTS

| | | |
|---|---|---|
| 2,361,036 | Kung | Oct. 24, 1944 |
| 2,466,420 | Hagemeyer | Apr. 5, 1949 |
| 2,484,067 | Boese | Oct. 11, 1949 |
| 2,515,595 | Geyer et al. | July 18, 1950 |
| 2,554,528 | Fitzpatrick | May 29, 1951 |
| 2,739,158 | Caldwell | Mar. 20, 1956 |

OTHER REFERENCES

Caldwell: abstract of application Serial No. 252,194, published Aug. 18, 1953, 673 O.G. 839.

Hamamoto et al.: Journ. of Pharmac. Soc. of Japan, Vol. 76, No. 8, pp. 956–58.